Patented July 6, 1943

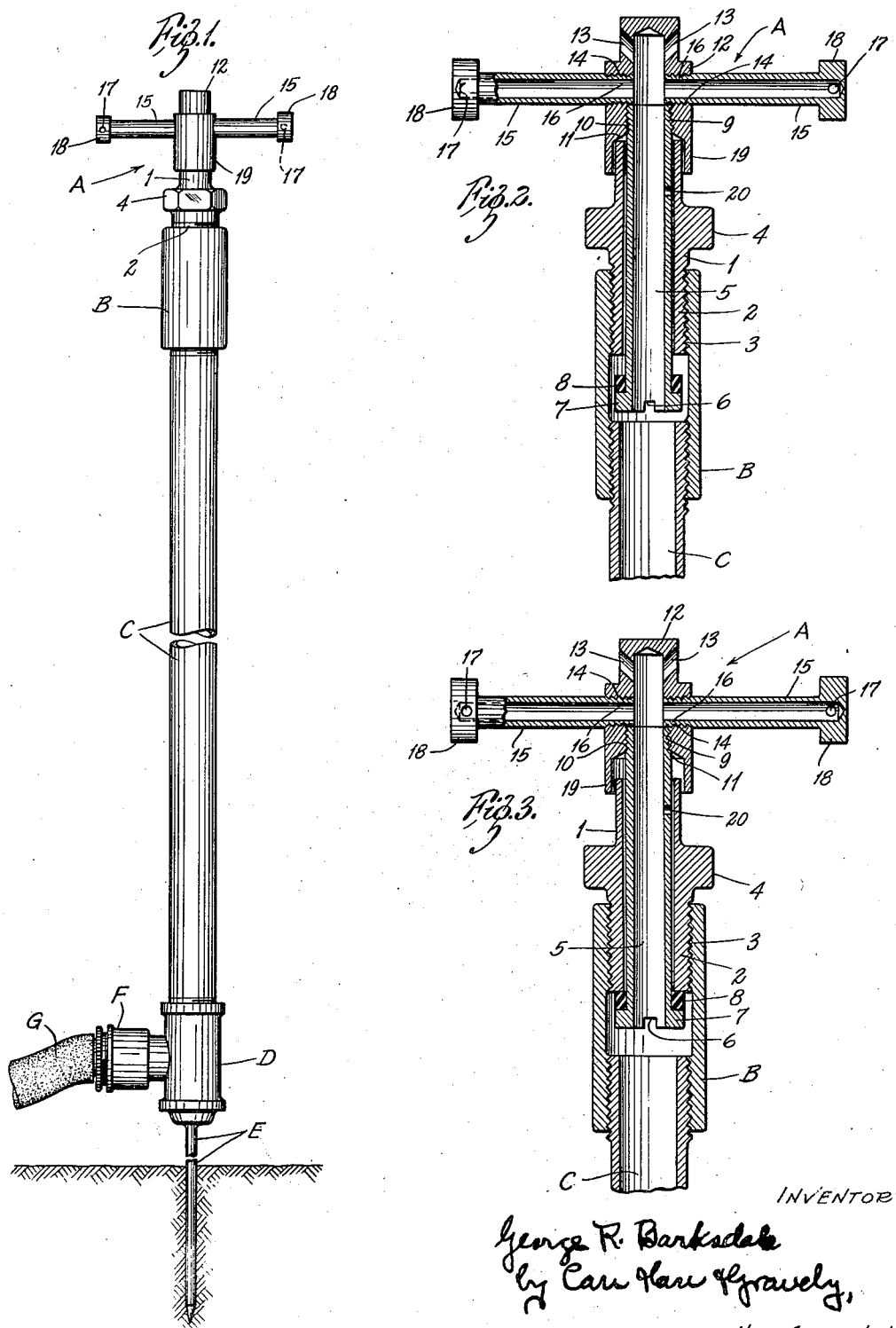

2,323,701

UNITED STATES PATENT OFFICE 2,323,701

ROTARY SPRINKLER

George R. Barksdale, Winnsboro, S. C.

Application March 15, 1943, Serial No. 479,177

5 Claims. (Cl. 299—69)

My invention relates to rotary sprinklers adapted for general use. The invention has as its principal object a rotary sprinkler that is simple and compact in construction and efficient and economical in operation. Other objects and advantages will appear hereinafter.

The invention consists in the rotary sprinkler and in the parts and combinations and arrangements of parts hereinafter described and claimed.

In the accompanying drawing,

Fig. 1 is an elevation of a rotary sprinkler embodying my invention,

Fig. 2 is a vertical sectional view on an enlarged scale, showing the position of the parts when not in operation; and Fig. 3 is a similar vertical sectional view, showing the position of the parts when the sprinkler is operating.

As indicated in Fig. 1, the device includes a sprinkler head indicated generally by A, a coupling B, a vertical pipe C and a coupling D, having a spike E for sticking into the ground to hold the sprinkler in any desired location. The spiked coupling has a fitting F for connection with a suitable hose G.

The details of construction of the sprinkler head proper are shown in Figs. 2 and 3. A tubular body member 1 has its lower end portion 2 externally threaded for cooperation with internal threads 3 in the upper coupling B and has flattened peripheral portions 4 to facilitate manipulation of the body when securing it in the coupling. Extending through the hollow body 1 and projecting beyond said body at top and bottom is a hollow stem 5 that is provided with alined slots 6 in its bottom for engagement with a suitable manipulating tool. The stem 5 has a projecting annular rib or flange 7 at the bottom that overlaps the lower end of the body member 1 and a suitable fiber or other washer 8 is mounted on said flange.

The upper end 9 of said hollow stem 5 is externally threaded and extends into the threaded portion 10 of the hollow 11 of a downwardly opening head 12. Said head 12 has upwardly inclining openings 13 through its sides near the top thereof.

The head 12 has transverse threaded bores 14 opening into the central hollow 11 and hollow sprinkler arms 15 have their ends 16 threaded and mounted in said threaded transverse bores 14. Each arm 15 has an opening 17 near its end that faces rearwardly with respect to the direction of rotation of the arm. The end of each arm 15 is provided with an enlarged head or boss 18.

The head 12 has a depending skirt portion 19 that overlaps the upper end of the hollow body 1 and is spaced therefrom. The stem 5 has a weep hole 20 therethrough below the top of the hollow body through which water may pass into the space between the stem 5 and the body 1 to reduce friction of the parts and to flush out any foreign matter that may find its way into the bearing.

As appears from Fig. 3, the force of water passing into the pipe C and sprinkler head A will lift the hollow stem 5, head 12, and parts carried thereby, the upper limit being the engagement of the stop or bearing washer 8 with the bottom of the tubular body 1. The force of the water will cause the stem 5, head 12 and arms 15 to rotate, a central cone or canopy of water being thrown out by the inclined openings 13 of the head 12 and spreading streams of water being thrown out by the openings 17 in the arms 15. The nature, volume and spread of the streams of water will vary with the member size, inclination and other constructional features of the several openings and with such other details as the length of the arms and the size and weight of the end enlargements.

The construction minimizes the danger of dirt and other foreign matter finding its way into the rotary parts, and any such matter that does work its way into the device will be flushed away by the flow of water through the bleed holes 20 into the space between the hollow stem 5 and the tubular body member 12. This flow of water has the further effect of reducing the friction between the parts.

The above described sprinkler is simple and compact in construction and can be built to give any desired water spray characteristics, so that the head may be made for numerous types of spraying requirements. It is efficient and economical in operation and it is durable in construction. Obviously, numerous changes may be made without departing from the invention and I do not wish to be limited to the precise construction shown.

What I claim is:

1. A sprinkler comprising a tubular body, a hollow stem projecting therethrough and having an annular flange at its lower end overlapping the bottom of said tubular body, a hollow head secured to the top of said stem, having upwardly inclined openings therethrough, a skirt depending from said head and spaced outwardly from the upper end of said body, and hollow sprinkler arms projecting from said head, each having an outlet opening near the end thereof.

2. A sprinkler comprising a tubular body, having its lower portion externally threaded, a hollow stem projecting therethrough and having an annular flange at its lower end overlapping the bottom of said tubular body, a hollow head secured to the top of said stem, having upwardly inclined openings therethrough, a skirt depending from said head and spaced outwardly from the upper end of said body, and hollow sprinkler arms projecting from said head, each having an outlet opening near the end thereof.

3. A sprinkler comprising a tubular body, a hollow stem projecting therethrough and having an annular flange at its lower end overlapping the bottom of said tubular body, a hollow head secured to the top of said stem, having upwardly inclined openings therethrough, said stem being externally threaded and said head being internally threaded, a skirt depending from said head and spaced outwardly from the upper end of said body, and hollow sprinkler arms projecting from said head, each having an outlet opening near the end thereof.

4. A sprinkler comprising a tubular body, a hollow stem projecting therethrough and having an annular flange at its lower end overlapping the bottom of said tubular body, and also having a bleed hole therethrough below the top of said tubular body, a hollow head secured to the top of said stem, having upwardly inclined openings therethrough, a skirt depending from said head and spaced outwardly from the upper end of said body, and hollow sprinkler arms projecting from said head, each having an outlet opening near the end thereof.

5. A sprinkler comprising a tubular body having its lower portion threaded, a hollow stem projecting therethrough and having an annular flange at its lower end overlapping the bottom of said tubular body, and also having a bleed hole therethrough below the top of said tubular body, a hollow head secured to the top of said stem, having upwardly inclined openings therethrough, the upper end of said stem being externally threaded and said head being internally threaded, a skirt depending from said head and spaced outwardly from the upper end of said body, and hollow sprinkler arms projecting from said head, each having an outlet opening near the end thereof.

GEORGE R. BARKSDALE.